United States Patent
Bohnsack et al.

(10) Patent No.: US 11,556,532 B2
(45) Date of Patent: Jan. 17, 2023

(54) HASH TRIE BASED OPTIMIZATION OF DATABASE OPERATIONS

(71) Applicant: SAP SE, Walldorf (DE)

(72) Inventors: Nico Bohnsack, Ingersleben (DE); Dennis Felsing, Leimen (DE); Arnaud Lacurie, Mannheim (DE); Wolfgang Stephan, Heidelberg (DE)

(73) Assignee: SAP SE, Walldorf (DE)

(*) Notice: Subject to any disclaimer, the term of this patent is extended or adjusted under 35 U.S.C. 154(b) by 205 days.

(21) Appl. No.: 16/366,176

(22) Filed: Mar. 27, 2019

(65) Prior Publication Data
US 2020/0311075 A1 Oct. 1, 2020

(51) Int. Cl.
G06F 16/2453 (2019.01)
G06F 16/22 (2019.01)
G06F 16/23 (2019.01)

(52) U.S. Cl.
CPC .... G06F 16/24537 (2019.01); G06F 16/2246 (2019.01); G06F 16/2255 (2019.01); G06F 16/2282 (2019.01); G06F 16/2308 (2019.01); G06F 16/2379 (2019.01)

(58) Field of Classification Search
None
See application file for complete search history.

(56) References Cited

U.S. PATENT DOCUMENTS

| | | | |
|---|---|---|---|
| 6,411,951 B1* | 6/2002 | Galindo-Legaria | G06F 16/24549 |
| 7,043,494 B1* | 5/2006 | Joshi | G06F 16/9027 |
| 9,953,058 B1* | 4/2018 | Sadri | G06F 16/2237 |
| 2006/0116989 A1* | 6/2006 | Bellamkonda | G06F 16/24556 |
| 2006/0218176 A1* | 9/2006 | Sun Hsu | G06F 16/2272 |
| 2007/0136331 A1* | 6/2007 | Hasan | G06F 16/9014 |
| 2013/0151502 A1* | 6/2013 | Yoon | G06F 16/221 707/714 |
| 2014/0372407 A1* | 12/2014 | Attaluri | G06F 16/278 707/714 |
| 2016/0171039 A1* | 6/2016 | Eisenreich | G06F 16/2365 707/698 |
| 2017/0255675 A1* | 9/2017 | Chavan | G06F 7/24 |
| 2019/0391974 A1* | 12/2019 | Choi | G06F 16/2456 |
| 2022/0365933 A1* | 11/2022 | Li | G06F 16/24545 |

OTHER PUBLICATIONS

Kissinger et al., QPPT: Query Processing on Prefix Trees, 2013 (Year: 2013).*

* cited by examiner

*Primary Examiner* — Dawaune A Conyers
(74) *Attorney, Agent, or Firm* — Mintz Levin Cohn Ferris Glovsky and Popeo, P.C.

(57) ABSTRACT

A method may include inserting, into a hash trie, data records from a database table. The inserting may include traversing the hash trie to identify, for each data record included in the database table, a corresponding node at which to insert the data record. The hash trie may be traversed based on a hash of a key value associated with each data record. The node at which to insert a data record may be identified based on an offset forming a binary representation of the hash of a key value associated with that data record. The offset may include a portion of a plurality of binary digits forming the binary representation. A data record may be inserted at a corresponding node by updating a data structure included at the node. A database operation may be performed based on the hash trie filled with the data records from the database table.

16 Claims, 8 Drawing Sheets

HASH TRIE BASED OPTIMIZATION OF DATABASE OPERATIONS

TECHNICAL FIELD

The subject matter described herein relates generally to database processing and more specifically to transactional memory based concurrency control.

BACKGROUND

Database management systems (DBMS) have become an integral part of many computing systems. For example, a database management system may store and manage a plurality of data records. In a relational database, the data records may be stored as rows in one or more database tables. Moreover, the database management system may be configured to execute one or more transactions operating on the data records. A transaction may include one or more queries (e.g., structured query language (SQL) statements) operating on the data records stored by the database management system including by, for example, selecting, updating, inserting, and/or deleting one or more corresponding rows in the database tables. The database management system may execute hundreds if not thousands of such transactions per second, at least some of which requiring complex multidimensional data analysis. As such, the performance of the database management system may require optimization in order to achieve optimal performance metrics including, for example, response time, computational resource consumption, throughput, and/or the like.

SUMMARY

Systems, methods, and articles of manufacture, including computer program products, are provided for performing a database operation based on a hash trie. In one aspect, there is provided a system. The system may include at least one data processor and at least one memory. The at least one memory may store instructions that result in operations when executed by the at least one data processor. The operations may include: inserting, into a hash trie, a first plurality of data records from a first database table, the inserting includes traversing the hash trie to at least identify, for a first data record from the first plurality of data records, a first node at which to insert the first data record, the hash trie being traversed based at least on a hash of a key value associated with the first data record, the first node being identified based at least on a first offset comprising a binary representation of the hash of the key value, the first offset including a first portion of a plurality of binary digits forming the binary representation, and the first data record being inserted at the first node by at least updating a data structure included at the first node; and performing, based at least on the hash trie filled with the first plurality of data records, a database operation on at least the first database table.

In some variations, one or more features disclosed herein including the following features may optionally be included in any feasible combination. A second node in the hash trie may be identified based at least on a second offset comprising the binary representation of the hash of the key value. The second offset may include a second portion of the plurality of binary digits forming the binary representation of the hash of the key value. Whether the second node is occupied by a second data record from the first plurality of data records that is associated with a different key value than the first data record may be determined. In response to determining that the second node is occupied by the second data record associated with the different key value, the traversing of the hash trie may continue from the second node to the first node.

In some variations, in response to determining that the first node is occupied by a second data record from the first plurality of data records that is associated with a same key value as the first data record, the data structure at the first node may be updated by at least storing, in the data structure, the first data record.

In some variations, the database operation may be a GROUP BY operation that groups, based at least on a respective key value associated with each of the first plurality of data records, the first plurality of data records into one or more groups. The GROUP BY operation may further determine, for each of the one or more groups, a corresponding aggregate value. In response to determining that the first node is occupied by a second data record from the first plurality of data records that is associated with a same key value as the first data record, the data structure at the first node may be updated by at least updating an aggregate value for a group of data records that include the first data record and the third data record.

In some variations, the database operation may be a JOIN operation to determine at least a subset of the first plurality of data records from the first database table having a matching key value to one or more of a second plurality of data records from a second database table. In response to determining that the first node is occupied by a second data record from the first plurality of data records that is associated with a same key value as the first data record, the first data record may be stored in a separate data structure and a vector at the first node may be updated to include a pointer to the separate data structure. The JOIN operation may be further performed by at least searching the hash trie filled with the first plurality of data records to determine that one or more of the second plurality of data records match the first data record stored at the first node in the hash trie and updating a vector at the first node to include an indication that the first data record matches the one or more of the second plurality of data records.

In some variations, the first database table may include a plurality of rows that each corresponds to one of the first plurality of data records. The first database table may further includes a plurality of columns. The key value may be stored in one or more of the plurality of columns designated as a key column.

In some variations, the data structure may include a table and/or a linked list.

In another aspect, there is provided a method for performing a database operation based on a hash trie. The method may include: inserting, into a hash trie, a first plurality of data records from a first database table, the inserting includes traversing the hash trie to at least identify, for a first data record from the first plurality of data records, a first node at which to insert the first data record, the hash trie being traversed based at least on a hash of a key value associated with the first data record, the first node being identified based at least on a first offset comprising a binary representation of the hash of the key value, the first offset including a first portion of a plurality of binary digits forming the binary representation, and the first data record being inserted at the first node by at least updating a data structure included at the first node; and performing, based at least on the hash trie filled with the first plurality of data records, a database operation on at least the first database table.

In some variations, one or more features disclosed herein including the following features may optionally be included in any feasible combination. The method may further include: identifying, based at least on a second offset comprising the binary representation of the hash of the key value, a second node in the hash trie, the second offset including a second portion of the plurality of binary digits forming the binary representation of the hash of the key value; determining whether the second node is occupied by a second data record from the first plurality of data records that is associated with a different key value than the first data record; and in response to determining that the second node is occupied by the second data record associated with the different key value, continuing the traversing of the hash trie from the second node to the first node.

In some variations, in response to determining that the first node is occupied by a second data record from the first plurality of data records that is associated with a same key value as the first data record, the data structure at the first node may be updated by at least storing, in the data structure, the first data record.

In some variations, the database operation may be a GROUP BY operation that groups, based at least on a respective key value associated with each of the first plurality of data records, the first plurality of data records into one or more groups. The GROUP BY operation may further determine, for each of the one or more groups, a corresponding aggregate value. In response to determining that the first node is occupied by a second data record from the first plurality of data records that is associated with a same key value as the first data record, the data structure at the first node may be updated by at least updating an aggregate value for a group of data records that include the first data record and the third data record.

In some variations, the database operation may be a JOIN operation to determine at least a subset of the first plurality of data records from the first database table having a matching key value to one or more of a second plurality of data records from a second database table. In response to determining that the first node is occupied by a second data record from the first plurality of data records that is associated with a same key value as the first data record, the first data record may be stored in a separate data structure and a vector at the first node may be updated to include a pointer to the separate data structure. The JOIN operation may be further performed by at least searching the hash trie filled with the first plurality of data records to determine that one or more of the second plurality of data records match the first data record stored at the first node in the hash trie and updating a vector at the first node to include an indication that the first data record matches the one or more of the second plurality of data records.

In some variations, the first database table may include a plurality of rows that each corresponds to one of the first plurality of data records. The first database table may further includes a plurality of columns. The key value may be stored in one or more of the plurality of columns designated as a key column.

In another aspect, there is provided a computer program product that includes a non-transitory computer readable storage medium. The non-transitory computer-readable storage medium may include program code that causes operations when executed by at least one data processor. The operations may include: inserting, into a hash trie, a first plurality of data records from a first database table, the inserting includes traversing the hash trie to at least identify, for a first data record from the first plurality of data records, a first node at which to insert the first data record, the hash trie being traversed based at least on a hash of a key value associated with the first data record, the first node being identified based at least on a first offset comprising a binary representation of the hash of the key value, the first offset including a first portion of a plurality of binary digits forming the binary representation, and the first data record being inserted at the first node by at least updating a data structure included at the first node; and performing, based at least on the hash trie filled with the first plurality of data records, a database operation on at least the first database table.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to using hash tries to optimize the performance of one or more database operations, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database management system (DBMS) may execute transactions that require the performance of one or more complex and computationally intensive database operations such as, for example, JOIN, GROUP BY, and/or the like. The performance of the database management system may be optimized, for example, by at least minimizing the time and computational resources required to execute such transactions. Accordingly, in some example embodiments, the database management system may use a hash trie to perform a database operation that accesses data in one or more database tables. For example, to perform a GROUP BY operation on a database table, the database management system may insert, into the hash trie, data records from the database table. Alternatively, to perform a JOIN operation between a first database table and a second database table, the database management system may insert, into the hash trie, data records from the first database table before searching the hash trie for data records from the second database table.

The hash trie may include a plurality of nodes. For example, a root node of the hash trie may include pointers to a first plurality of children nodes while each of the first plurality of children nodes may include pointers to a second plurality of children nodes. In some example embodiments, inserting a data record into a hash trie may include identifying, based at least on a hash of a key value associated with the data record, a node in the hash trie at which to insert the data record. For example, the data record may correspond to a row in a database table whereas the key associated with the data record may correspond to a value occupying a column in the row. To insert the data record into the hash trie, the database management system may traverse the hash trie based on a binary representation of the hash of the key value associated with the data record. The binary representation of the hash of the key value may include a plurality of offset, each of which including a portion of the binary digits forming the binary representation of the hash. Accordingly, to identify the node at which to insert the data record, the database management system may traverse the hash trie from the root node of the hash trie to a first node in the first plurality of children nodes that corresponds to a first offset in the binary representation of the hash of the key value associated with the data record. The data record may be stored at that first node if the first node is unused (e.g., not storing a data record associated with a different key). Alternatively, the database management system may continue to traverse the hash trie from the first node to a second node in one of the second plurality of children nodes corresponding to a second offset in the binary representation of the hash of the key value.

In some example embodiments, each of the plurality of nodes in the hash trie may include a data structure for storing at least a portion of the data record. For example, each of the plurality of nodes in the hash trie may include a table, a linked list, and/or the like, for storing the data record which, as noted, may correspond to a row in a database table having one or more columns. The position in the data structure for storing the data record may be determined based at least on an offset in the binary representation of the hash of the key value associated with the data record. For instance, the database management system may insert, based at least on the first offset in the binary representation of the hash, the data record at the first node in the first plurality of children nodes descending from the root node of the hash trie. The database management system may further store, in the data structure included in the first node, the data record at a position corresponding to the first offset in the binary representation of the hash. As such, at least a portion of the data record may be stored at the first node in the hash trie instead of in a separate storage area referenced by pointers included in the node. Storing data records at the nodes in the hash trie may reduce the quantity of cache misses that occur, for example, when traversing the hash trie to determine whether a data record is already present in the hash trie. Due to the possibility of hash collisions, to determine whether two data records match may require comparing the actual key values associated with each data record instead of merely the hashes of the two key values. Accordingly, having the key values stored at the node in the hash trie may eliminate the cache misses that are triggered when the traversal of the hash trie requires a comparison of actual key values.

In some example embodiments, the database management system may use the hash trie to perform one or more database operations, which may optimize the performance of the database management system including by minimizing the time and computational resources required to perform the one or more database operations. For example, the database management system may perform a GROUP BY operation on a database table in order to group the data records in the database table in accordance with the values in one or more columns of the database table. The database management system may perform the GROUP BY operation by at least inserting, into the hash trie, the database table. Alternatively and/or additionally, the database management system may perform a JOIN operation on a first database table and a second database table. For instance, an INNER JOIN operation may be performed to identify data records from the first database table that match data records from the second database table. By contrast, an OUTER JOIN operation may be performed to identify the matching data records as well as non-matching data records in either the first database table or the second database table. The database management system may perform the JOIN operation by at least inserting, into the hash trie, the data records from the first database table before searching the hash trie to locate, in the hash trie, data records from the second database table.

Figure 1:
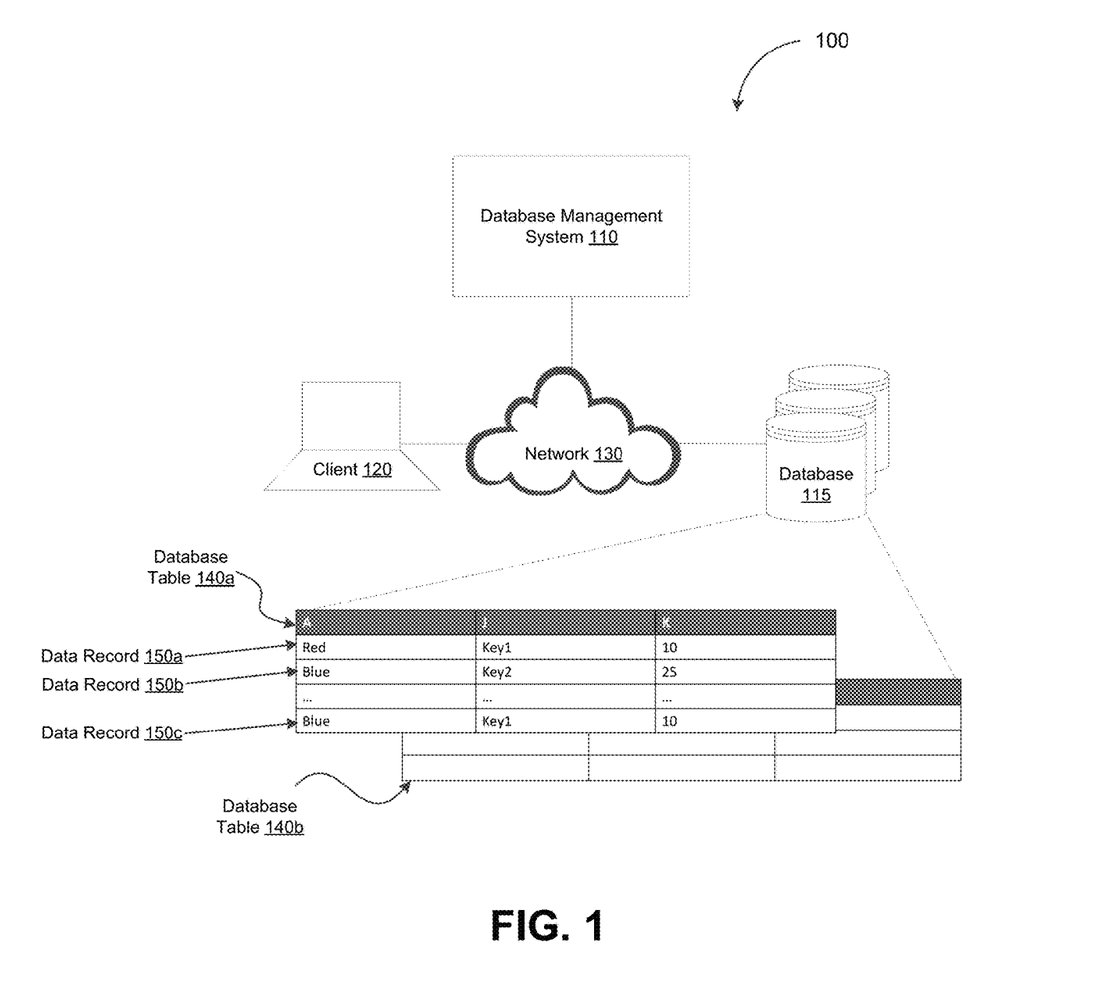
FIG. 1 depicts a system diagram illustrating a database system, in accordance with some example embodiments.

FIG. 1 depicts a system diagram illustrating a database system 100, in accordance with some example embodiments. Referring to FIG. 1, the database system 100 may include a database management system (DBMS) 110 that is communicatively coupled with a client 120 via a network 130. The network 130 may be any wired and/or wireless network including, for example, a wide area network (WAN), a local area network (LAN), a virtual local area network (VLAN), a public land mobile network (PLMN), the Internet, and/or the like.

Referring again to FIG. 1, the database management system 110 may be coupled with a database 115. The database management system 110 and/or the database 115 may form any type of database system including, for example, a graph database, an in-memory database, a relational database, a non-SQL (NoSQL) database, and/or the like. Moreover, the client 120 may interact with the database management system 110 in order to access data stored in the database 110. For example, the client 120 may send, to the database management system 110, a request to execute a transaction, which may include one or more database operations (e.g., SQL statements and/or the like) on the data records stored in the database 115. In response to the request from the client 120, the database management system 110 may execute the transaction by at least performing the one or more database operations included in the transaction. For instance, the database management system 110 may perform a GROUP BY operation, a JOIN operation, and/or the like on one or more database tables stored in the database 115 including, for example, a first database table 140a, a second database table 140b, and/or the like. In some example embodiments, the database management system 110 may use a hash trie to perform the one or more database operations. The use of the hash trie may optimize the performance of the database management system 110 including by minimizing the time and computational resources required to perform the one or more database operations.

Figure 2A:
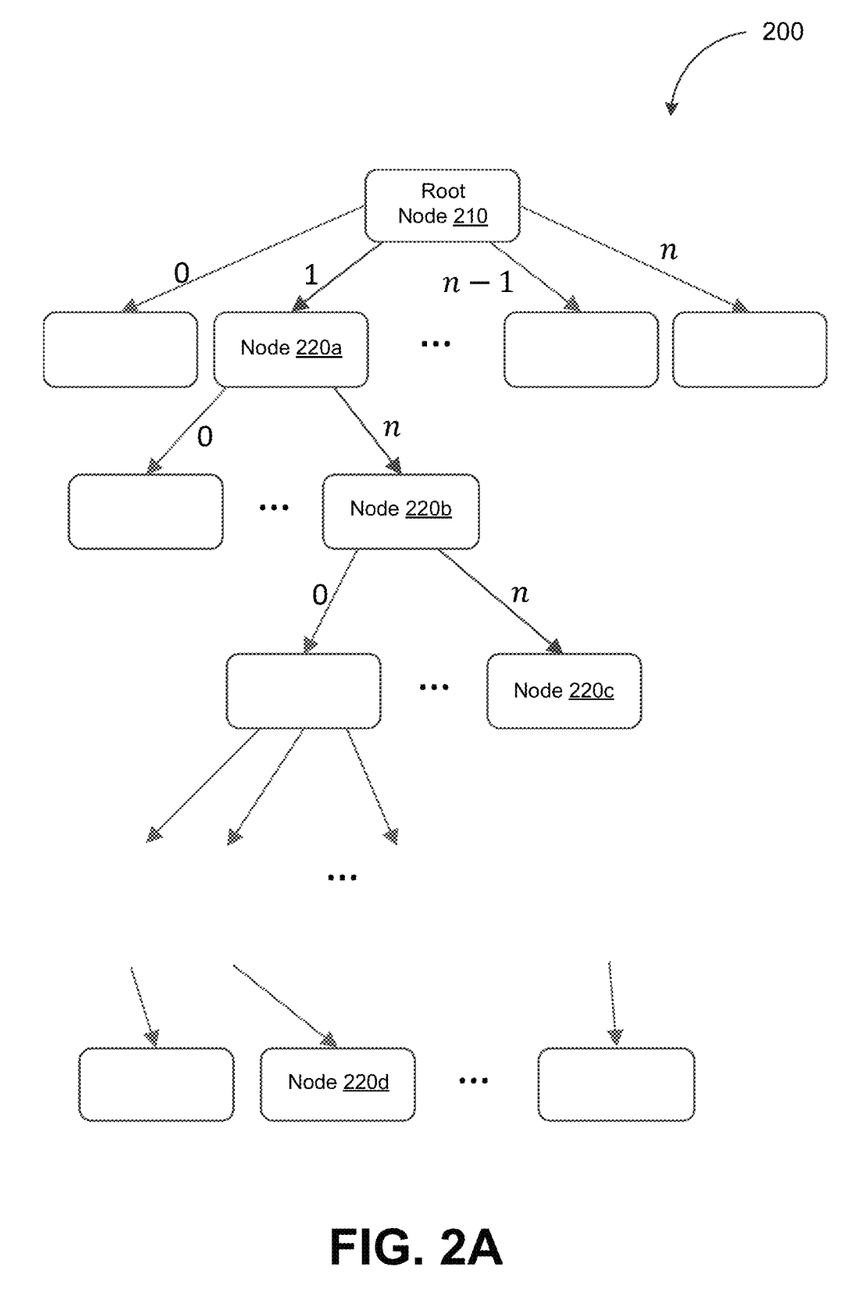
FIG. 2A depicts an example of a hash trie, in accordance with some example embodiments.

FIG. 2A depicts an example of a hash trie 200, in accordance with some example embodiments. Referring to FIG. 2A, the hash trie 200 may include a plurality of nodes including, for example, a root node 210, a first node 220a, a second node 220b, a third node 220c, a fourth node 220d, and/or the like. The plurality of nodes forming the hash trie 200 may occupy one or more levels with, for example, the root node 210 at a top (e.g., zeroth) level of the hash trie and the first node 220a, the second node 220b, the third node 220c, and/or the fourth node 220d occupying successive levels of the hash trie 200. As shown in FIG. 2A, the first node 220a may be one of an n quantity of nodes descending from the root node 210 and occupying a subsequent (e.g., first) level of the hash trie 200. For example, the root node 210 may include an n quantity of pointers that each point to one of the n quantity of nodes descending from the root node 210. Each of the n quantity of nodes descending from the root node 210 may include another n quantity of pointers pointing to an n quantity of children nodes occupying a successive (e.g., second) level of the hash trie 200. Furthermore, the children nodes of the n quantity of nodes descending from the root node 210 may each include an additional n quantity of pointers pointing to an n quantity of additional children nodes occupying another successive (e.g., third) level of the hash trie 200. For instance, the second node 220b may be one of the n quantity of children nodes descending from the first node 220a while the third node 220c may be one of the n quantity of children nodes descending from the second node 220b.

In some example embodiments, to perform a database operation (e.g., JOIN, GROUP BY, and/or the like), the database management system 110 may insert, into the hash trie 200, the first database table 140a, the second database table 140b, and/or the like. For example, the database management system 110 may insert the first database table 140a into the hash trie 200 in order to perform a GROUP BY operation on the first database table 140b. Alternatively, to perform a JOIN operation on the first database table 140a and the second database table 140b, the database management system 110 may insert the first database table 140a into the hash trie 200 before probing the hash trie 200 for data records from the second database table 140b. To insert the first database table 140a into the hash trie 200, the database management system 110 may identify, for each data record in the first database table 140a, a corresponding node in the hash trie 200. The node corresponding to a data record in the first database table 140a may be identified based on a hash of a key value associated with the data record.

Figure 2B:
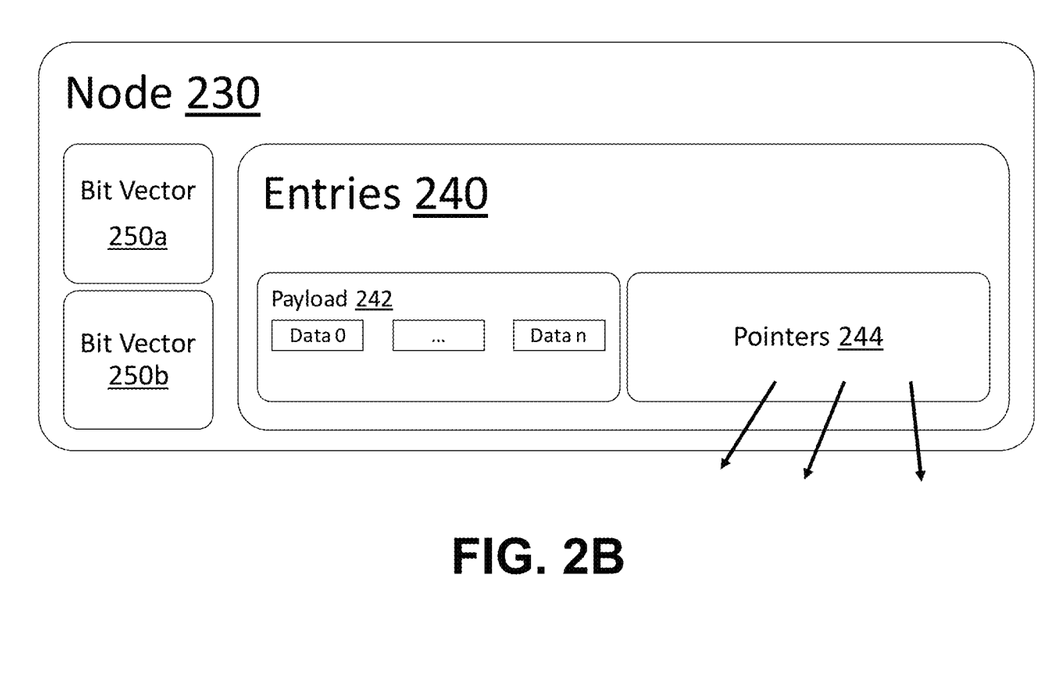
FIG. 2B depicts an example of a node from a hash trie, in accordance with some example embodiments.

FIG. 2B depicts an example of a node 230 in the hash trie 200, in accordance with some example embodiments. It should be appreciated that the node 230 may implement one or more of the plurality of nodes in the hash trie 200 including, for example, the root node 210, the first node 220a, the second node 220b, the third node 220c, the fourth node 220d, and/or the like. Referring to FIG. 2B, the node 230 may include one or more entries 240, a first bit vector 250a, and a second bit vector 250b. The one or more entries 240 may include a payload 242 as well as a plurality of pointers 244 pointing, for example, to an n quantity of children nodes descending from the node 230. Meanwhile, the first bit vector 250a and/or the second bit vector 250b may store data required for handling the hash trie 200 including, for example, indicators marking the valid entries present in the node 230.

In some example embodiments, the payload 242 may be a data structure configured to store data records inserted into the hash trie 200, for example, at the node 230. The payload 242 may be any type of data structure including, for example, a table, a linked list, and/or the like. Moreover, the payload 242 may be configured based on the type of database operation being performed such that the structure of the payload 242 used for performing a JOIN operation may differ from the structure of the payload 242 used for performing a GROUP BY operation. Nevertheless, as shown in FIG. 2B, the payload 242 may include an n quantity of positions for storing the data records inserted into the hash trie 200 at the node 230. To insert a data record from the first database table 140a into the hash trie 200, for example, at the node 230, the database management system 110 may further identify, based on a hash of a key value associated with the data record, one of the n quantity of positions in the payload 242 for storing the data record.

Figure 2C:
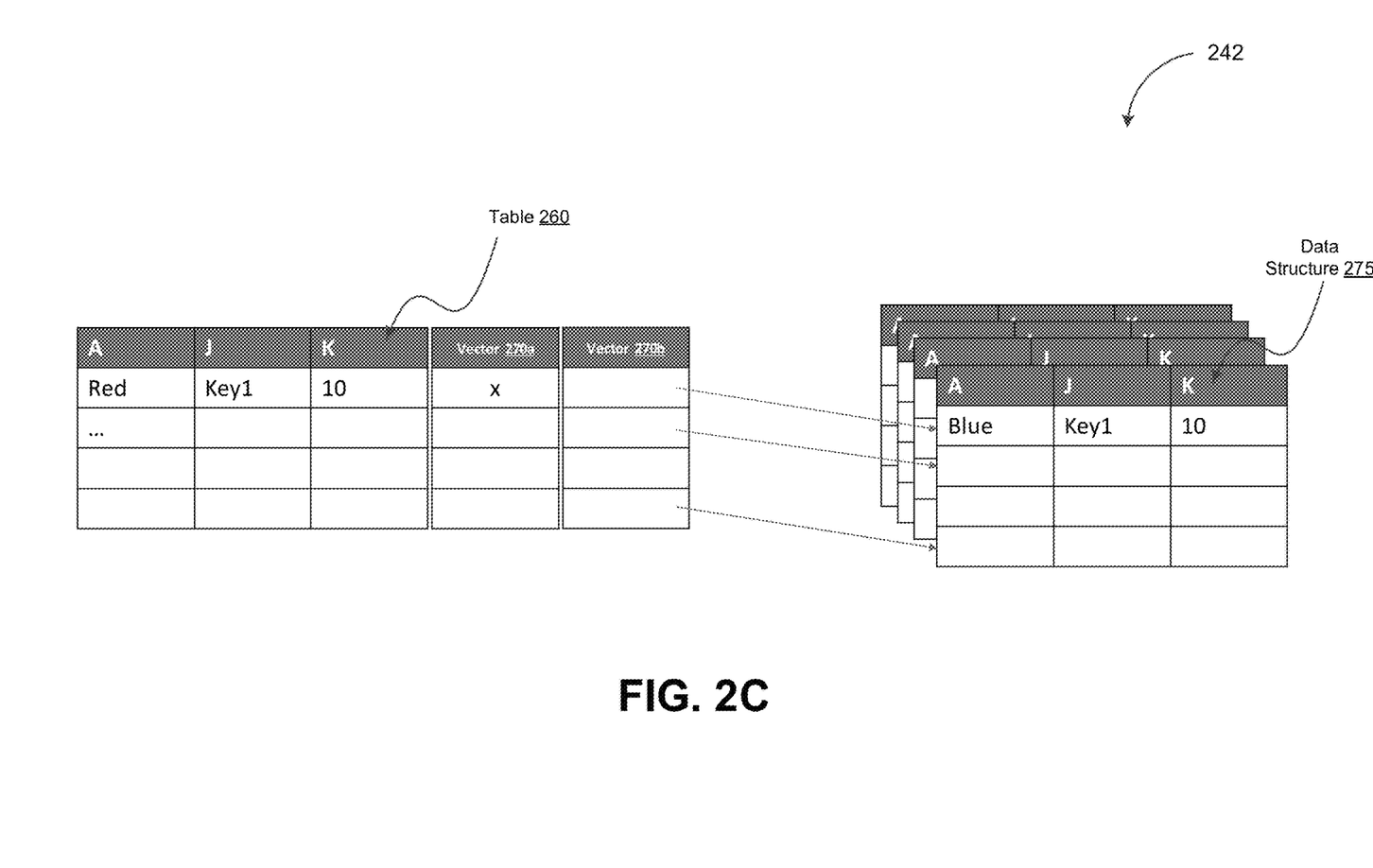
FIG. 2C depicts an example of a data structure included in a node of a hash trie, in accordance with some example embodiments.

FIG. 2C depicts an example of the payload 242 included in the node 230 of the hash trie 200, in accordance with some example embodiments. Referring to FIG. 2C, in some example embodiments, the payload 242 may be any type of data structure (e.g., a table, a linked list, and/or the like) having an n quantity of positions for storing the data records inserted into the hash trie 200, for example, at the node 230. Furthermore, as shown in FIG. 2C, the payload 242 may include a table 260, a first vector 270a, and a second vector 270b. For instance, the first vector 270a may be a bit vector while the second vector 270b may store one or more pointers or references. The bits in the first vector 270a and the pointers included in the second vector 270b may each correspond to a record added to the table 260 from the first database table 140a. For example, the database management system 110 may set, in the first vector 270a, a bit (e.g., from a value of "0" to a value of "1") corresponding to the first data record 150a from the first database table 140a when the database management system 110 is probing the hash trie 200 and encounters a data record from the second database table 140b having the same key value $key_1$ as the first data record 150a. Meanwhile, the database management system 110 may store, in the second vector 270b, a pointer to additional data structures (e.g., a data structure 275 and/or the like) for holding duplicate data records from the same database table such as, for example, the third data record 150c having the same first key value $key_1$ as the first data record 150a. Accordingly, a NULL value in the second vector 270b may indicate that a corresponding data record does not have any duplicate data records in the same database table.

In some example embodiments, to perform a JOIN operation (e.g., an OUTER JOIN operation), bits in the first vector 270a may be set to indicate matching data records, for example, when the hash trie 200 filled with data records from the first database table 140a is probed for data records from the second database table 140b. The payloads of the nodes in the hash trie 200 may subsequently be traversed to identify, based unset bits in the first vector 270a, data records from the first database table 140a that do not match any data records from the second database table 140b.

As shown in FIG. 1, the first database table 140a may include a plurality of columns including, for example, column A, column J, column K, and/or the like. At least one of the plurality of columns in the first database table 140a may be designated as a key such that the hash of each value occupying that column may be used to insert a corresponding data record into the hash trie 200. For instance, as shown in FIG. 1, the column J may be designated as the key for the first database table 140a. Accordingly, the hash of a first key value $key_1$ may be used to insert a first data record 150a into the hash trie 200 while the hash of a second key value $key_2$ may be used to insert a second data record 150d into the hash trie 200.

Figure 3:
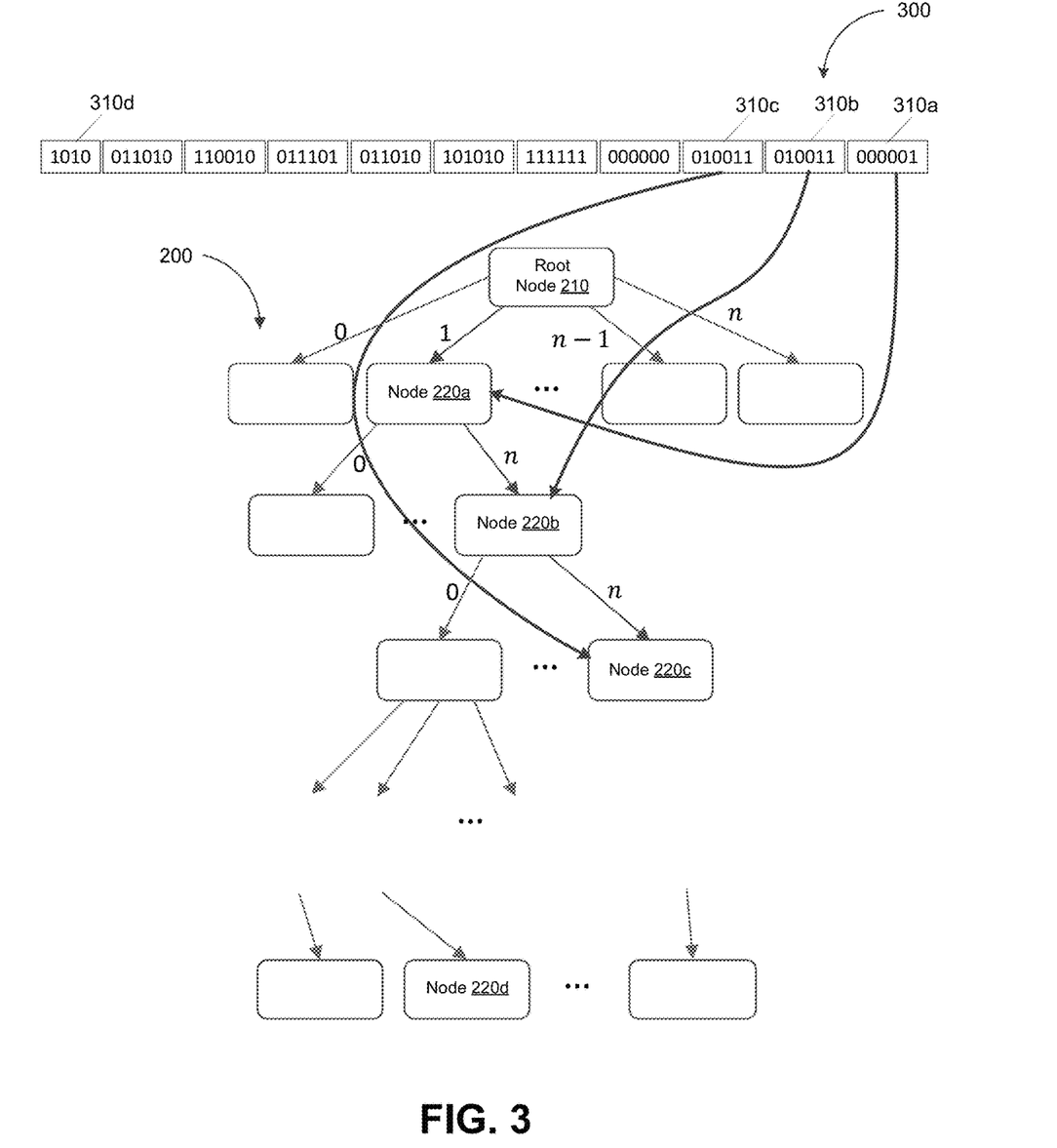
FIG. 3 depicts an example of a mapping from a hash of a key value associated with a data record to a node in a hash trie, in accordance with some example embodiments.

FIG. 3 further illustrates a mapping from the hash of the first key value $key_1$ associated the first data record 150a to a node in the hash trie 200, in accordance with some example embodiments. Referring to FIG. 3, in some example embodiments, the database management system 110 may insert, into the hash trie 200, the first data record 150a by at least traversing the hash trie 200 based on a binary representation 300 of the first key value $key_1$ associated the first data record 150a. For example, the binary representation 300 of the first key value $key_1$ may include a plurality of offsets including, for example, a first offset 310a, a second offset 310b, a third offset 310c, a fourth offset 310d, and/or the like. Each of the plurality of offsets may include a portion of a plurality of binary digits forming the binary representation 300 of the first key value $key_1$ associated with the first data record 150a. Accordingly, each of the plurality of offsets may be associated with a value corresponding to a portion of the binary digits forming the binary representation 300 of the first key $key_1$. For instance, as shown in FIG. 3, the first offset 310a may be associated with a value corresponding to the binary digits 000001, the second offset 310b may be associated with a value corresponding to the binary digits 010011, and the third offset 310c may be associated with a value corresponding to the binary digits 010011. The respective values of the first offset 310a, the second offset 310b, and the third offset 310c may be mapped to a corresponding node of the hash trie 200. Moreover, it should be appreciated that each of the n quantity of nodes may correspond to one of the possible values of the first offset 310a, the second offset 310b, the third offset 310c, and/or the like.

To traverse the hash trie 200 may include traversing one or more nodes corresponding to the value associated with each of the plurality of offsets included in the binary representation 300 of the first key value $key_1$. For example, the database management system 110 may traverse the hash trie 200 from the root node 210 to the first node 220a based at least on the value associated with the first offset 310a (e.g., the numerical value of the first offset 310a may map to the correspondingly numbered node "1"). In some example embodiments, the database management system 110 may determine to insert the first data record 150a at the first node 220a if the first node 220a is unused and not occupied by another data record with a different key value (e.g., the second data record 140b associated with the second key value $key_2$). In that case, the database management system 110 may store the first data record 150a in the payload 242, for example, at a position corresponding to the value of the first offset 310a. Alternatively, if the first node 220a is occupied by another data record with a different key value, the database management system 110 may continue the traversal of the hash trie 200 to a subsequent level of the hash trie 200. For instance, the database management system 110 may continue to traverse the hash trie 200 from the first node 220a to the second node 220b based at least on the value of the second offset 310b in the binary representation 300 of the first key value $key_1$ (e.g., the numerical value of the second offset 310b may map to a node numbered n). If the first data record 150a cannot be stored at the second node 220b, the database management system 110 may continue the traversal of the hash trie 200 from the second node 220b to the third node 220c based at least on the value of the third offset 310c in the binary representation 300 of the first key value $key_1$.

In some example embodiments, the database management system 110 may continue to traverse the hash trie 200 until the lowest level of the hash trie 200 which, as shown in FIGS. 2A and 3, may include a plurality of leaf nodes including, for example, the fourth node 220d. When the traversal of the hash trie 200 reaches the lowest level of the hash trie 200, the database management system 110 may apply linear probing to identify, for example, the fourth node 220d, for storing the first data record 150a. It should be appreciated that with linear probing, the database management system 110 may store the first data record 150a at any unused node occupying the lowest level of the hash trie 200 instead of using the value of the fourth offset 310d to identify a specific node for storing the first data record 150a. Moreover, upon identifying the node for storing the first data record 150a, the database management system 110 may store the first data record 150a in a data structure at the node such as, for example, the payload 242 in the node 230.

As noted, the database management system 110 may use the hash trie 200 to perform a database operation such as, for example, a JOIN operation, a GROUP BY operation, and/or the like. According to some example embodiments, the payload 242 may be configured based on the type of database operation being performed such that the structure of the payload 242 used for performing a JOIN operation may differ from the structure of the payload 242 used for performing a GROUP BY operation. For example, to perform some JOIN operations (e.g., OUTER JOIN and/or), the payload 242 may be configured to include the first vector 270a for storing indicators that identify duplicate data records. As noted, the first vector 270a may be a bit vector that is updated when the hash trie 200 filled with data records from the first database table 140a is probed for data records from the second database table 140b. Meanwhile, the second vector 270b may store pointers to additional data structures (e.g., the data structure 275 and/or the like) for storing the duplicate data records.

Accordingly, subsequent to inserting the first data record 150a at the node 230 of the hash trie 200, the database management system 110 may again traverse the hash trie 200 to insert, into the hash trie 200, the third data record 150c. Because the third data record 150c share the same first key value $key_1$, the database management system 110 may determine to insert the third data record 150c at the same node 230 as the first data record 150a. For instance, as shown in FIG. 2C, the third data record 150c may be stored in the data structure 275 while the second vector 250b may be updated, at a position corresponding to the position at which the first data record 150a is stored in the payload 242, to include a pointer to the data structure 275. To perform a JOIN operation (e.g., OUTER JOIN operation) between the first database table 140a and the second database table 140b, the database management system 110 may probe the hash trie 200 after the hash trie 200 is filled with the data records from the first database table 140a including, for example, the first data record 150a, the second data record 150b, and the third data record 150. The database management system 110 may update the first vector 270a when, for example, the database management system 110 determines that a data record from the second database table 140a has the same first key value $key_1$ as the first data record 150a inserted at the node 230 of the hash trie 200.

In some example embodiments, the database management system 110 may call one or more functions to operate on the hash trie 200. For instance, the database management system 110 may call an insert( ) function with a row from the first database table 140a in order to insert, for example, the first data record 150a, the second data record 150b, and/or the third data record 150c into the hash trie 200. The insert( ) function may be configured to return a Boolean value indicative of whether the data record being inserted is already present in the hash trie 200. This may be the case when, for example, the third data record 150c is being inserted into the hash trie 200 when the first data record 150c having the same first key value $key_1$ is already in the hash trie 200. Meanwhile, a payload handler associated with the logic of the hash trie 200 may call functions such as, for example, getHash( ) Equal( ) and/or insert( ) in order to operate on the payload included at the nodes in the hash trie 200. For instance, the payload handler may call the getHash( ) function in order to calculate the hash of the first key value $key_1$, the second key value $key_2$, and/or the like. The Equal( ) function may be called in order to compare, for example, the third data record 150c being inserted into the node 230 and the first data record 150a already occupying the node 230. The Equal( ) function may also be called in order to compare data records occupying two different hash tries during a merge of two separate tries.

It should be appreciated that the logic of the hash trie 200 may be decoupled from the handling of the payload stored as part of the hash trie 200. The logic associated with the hash trie 200 includes a check to determine whether a data record being inserted into the hash trie 200 matches (e.g., has a same key value) as a data record already present in the hash trie 200. However, as noted, the structure of the payload at each node of the hash trie 200 may vary depending on the database operation (e.g., GROUP BY, JOIN, and/or the like) being performed. Accordingly, the exact implementation of the comparison between two data records may be part of the payload handler and not part of the logic of the hash trie 200. The payload handler may provide an interface between the hash trie 200 and the database management system 110 operating on the hash trie 200.

Figure 4A:
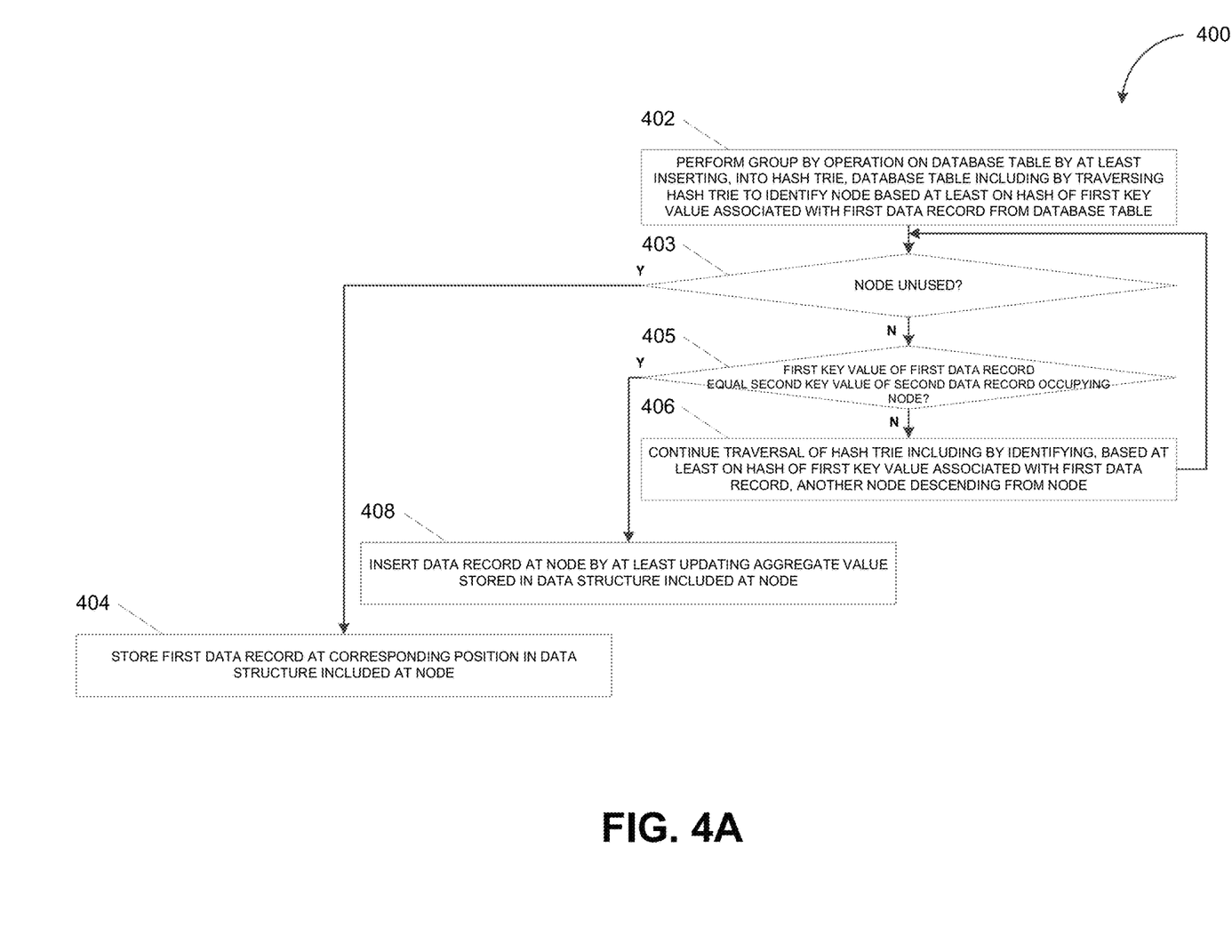
FIG. 4A depicts a flowchart illustrating a process for performing a GROUP BY operation, in accordance with some example embodiments.

FIG. 4A depicts a flowchart illustrating a process 400 for performing a GROUP BY operation, in accordance with some example embodiments. Referring to FIGS. 1, 2A-C, 3, and 4A, the process 400 may be performed by the database management system 110 in order to perform a GROUP BY operation, for example, on the first database table 140a. As noted, in some example embodiments, the database management system 110 use the hash trie 200 to optimize the performance of the GROUP BY operation including, for example, to at least minimize the time and computational resources required to perform the GROUP BY operation.

At 402, the database management system 110 may perform a GROUP BY operation on a database table by at least inserting, into the hash trie 200, the database table including by traversing the hash trie 200 to identify node based at least on a hash of a first key value of associated with a first data record from the database table. For example, the database management system 110 performs the GROUP BY operation on the first database table 140a to determine an aggregate value for groups of data records grouped based on the values occupying one or more columns of the first database table 140a. Accordingly, the database management system 110 may insert, into the hash trie 200, data records from the first database table 140a including, for example, the first data record 150a, the second data record 150b, the third data record 150c, and/or the like. If column J is designated as the GROUP BY column, then the database management system 110 may traverse the hash trie 200 based on the hashes of the values occupying column J. Alternatively, if column A and column J are designated as GROUP BY columns, then the database management system may traverse the hash trie 200 based on the hashes of the combined values from column A and column J.

Referring again to FIG. 1, if column J is designated as the GROUP BY column, the values of occupying column J may serve as key values for determining the nodes in the hash trie 200 at which to insert the corresponding data records from the first database table 140a. For example, FIG. 3 shows that to identify a node in the hash trie 200 for storing the first data record 150a, the database management system 110 may traverse the hash trie 200 based on the binary representation 300 of the first key value $key_1$, which occupies column J of the first data record 150a. As FIG. 3 further shows, the binary representation 300 of the first key value $key_1$ may include a plurality of offsets including, for example, the first offset 310a, the second offset 310b, the third offset 310c, and/or the like. The database management system 110 may identify, for instance, the first node 220a based at least on the value of the first offset 310a.

At 403, the database management system 110 may determine whether the node is unused. For example, the database management system 110 may determine whether the first node 220a identified based on the value of the first offset 310a is unused. As used herein, the first node 220a may be considered unused if the first node 220a is not occupied by another data record.

At 403-Y, the database management system 110 may determine that the node is unused. For example, the database management system 110 may determine that the first node 220a is unused if the first node 220a is not already occupied by another data record such as, for example, the second data record 150b, the third data record 150c, and/or the like. Accordingly, at 404, the database management system 110 may store the first data record at a corresponding position in a data structure included at the node. For example, the database management system 110 may store, in a payload of the first node 220a, the first data record 150a. The first data record 150a may be stored at a position in the payload corresponding to the value of the first offset 310a used to identify the first node 220a. By contrast, it should be appreciated that if the first data record 150a is being stored at the second node 220a, the database management system 110 may store the first data record 150a in a payload of the second node 220b at a position corresponding to the value of the second offset 310b used to identify the second node 220b.

Alternatively, at 403-N, the database management system 110 may determine that the node is used. For instance, the database management system 110 may determine that the first node 220a is used if the first node 220a is already occupied by the second data record 150b, the third data record 150c, and/or the like. As such, at 405, the database management system 110 may determine whether the first key value of the first data record is a same as a second key value of a second data record occupying the node. For example, the database management system 110 may compare the first key value $key_1$ of the first data record 150a to the second key value $key_2$ of the second data record 150b or the first key value $key_1$ of the third data record 150c.

At 405-N, the database management system 110 may determine that the first key value of the first data record is not the same as the second key value of the second data record occupying the node. For example, the first node 220a may be occupied by the second data record 150b, which may be associated with the second key value $key_2$. Being associated with a different key value may indicate that the first data record 150a does not belong to a same group as the second data record 150b as required by the GROUP BY operation. Accordingly, at 406, the database management system 110 may continue the traversal of the hash trie 200 including by identifying, based at least on the hash of the first key value of associated with the first data record, another node descending from the node. For instance, the database management system 110 may continue to traverse the hash trie 200 by at least identifying the second node 220b. The second node 220b may descend from the first node 220b. Moreover, the second node 220b may be identified based at least on the value of the second offset 310b included in the binary representation 300 of the first key value $key_1$ associated with the first data record 150a. Upon identifying the other node descending from the node, the process 400 may further continue at 403 at which the database management system 110 determines whether the node is unused.

Alternatively, at 405-Y, the database management system 110 may determine that the first key value of the first data record is the same as the second key value of the second data record occupying the node. For example, the first node 220a may be occupied by the third data record 150c, which may be associated with the same first key value $key_1$ as the first data record 150a. Being associated with the same key value may indicate that the first data record 150a belongs to the same group as the third data record 150c as required by the GROUP BY operation. Accordingly, at 408, the database management system 110 may insert the first data record at the node by at least updating an aggregate value stored in the data structure included at the node. In some example embodiments, the database management system 110 may insert the first data record 150a at the first node 220a by at least updating a column in the payload of the first node 220a storing an aggregate value across data records in a same group as the first data record 150a and the third data record 150c. For example, the aggregate value may be a sum, average, minimum, maximum, medium, count, mode, range, and/or the like that is determined based on the data records in the same group as the first data record 150a and the third data record 150c.

Figure 4B:
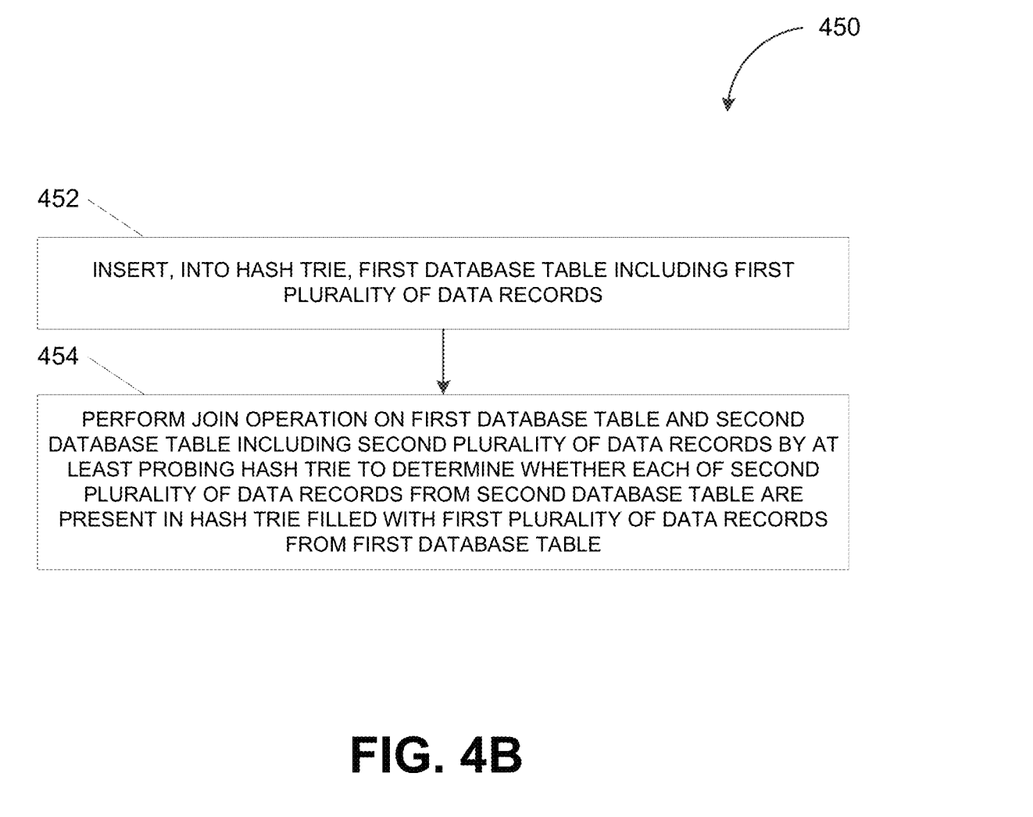
FIG. 4B depicts a flowchart illustrating a process for performing a JOIN operation, in accordance with some example embodiments.

FIG. 4B depicts a flowchart illustrating a process 450 for performing a JOIN operation, in accordance with some example embodiments. Referring to FIGS. 1, 2A-C, 3, and 4B, the process 450 may be performed by the database management system 110 in order to perform a JOIN operation, for example, on the first database table 140a and the second database table 140b. As noted, in some example embodiments, the database management system 110 use the hash trie 200 to optimize the performance the JOIN operation including, for example, to at least minimize the time and computational resources required to perform the JOIN operation.

At 452, the database management system 110 may insert, into the hash trie 200, a first database table including a first plurality of data records. In some example embodiments, the database management system 110 may insert the first database table 140a into the hash trie 200 by at least inserting, into the hash trie 200, a plurality of data records from the first database table 140a including, for example, the first data record 150a, the second data record 150b, the third data record 150c, and/or the like. To perform the JOIN operation, the plurality of data records from the first database table 140a may be inserted into the hash trie 200 based on one or more columns in the first database table 140a designated as JOIN attributes. For instance, column J may be designated as the JOIN attribute, in which case to insert the first data record 150a into the hash trie 200, the database management system 110 may traverse the hash trie 200 based at least on the hash representation 300 of the first key value $key_1$ occupying column J of the first data record 150a. Referring to FIG. 3, the database management system 110 may traverse the hash trie 200 from the root node 210 to the first node 220a corresponding to the value of the first offset 310a in the hash representation 300 of the first key value $key_1$ and from the second node 220b to the third node 220c corresponding to the value of the second offset 310b in the hash representation 300 of the first key value $key_1$. The database management system 110 may continue to traverse the hash trie 200 until the database management system 110 locates an unoccupied node or a node occupied by a duplicate data record (e.g., another data record having the same first key value $key_1$ as the first data record 150a).

According to some example embodiments, upon identifying a node at which to insert the first data record 150a, the database management system 110 may store the first data record 150a in the payload at that node. Nevertheless, it should be appreciated at the first data record 150a may be a duplicate data record having a same key value as another data record already occupying the same node. Instead of storing duplicate data records at the same node, the database management system 110 may store duplicate data records in separate data structures. For instance, as FIG. 2C shows, the third data record 150c that is a duplicate of the first data record 150a already occupying the payload 242 may be stored in the data structure 275 while the second vector 270b may be updated, at a position corresponding to the position at which the first data record 150a is stored in the payload 242, to include a pointer to the data structure 275.

At 454, the database management system 110 may perform a JOIN operation on the first database table and a second database table including a second plurality of data records by at least searching the hash trie 200 to determine whether each of the second plurality of data records are present in the hash trie 200 filled with the first plurality of data records from the first database table. To perform a JOIN operation on the first database table 140a and the second database table 140b, the database management system 110 may be required to determine whether the data records from the second database table 140b match any of the data records from the first database table 140a. For instance, an INNER JOIN operation between the first database table 140a and the second database table 140b may be performed to identify data records from the first database table 140a that match data records from the second database table 140b. Meanwhile, an OUTER JOIN operation between the first database table 140a and the second database table 140b may be performed to identify the matching data records as well as data records in the first database table 140a that do not match any data records from the second database table 140b.

In some example embodiments, to perform the JOIN operation, the database management system 110 may, subsequent to inserting the first database table 140a into the hash trie 200, traverse the hash trie 200 based on the hash of the key values associated with the data records from the second database table 140b to determine whether the same key values are already present in the hash trie 200. It should be appreciated that if the key value of a data record from the second database table 140b is found in the hash trie 100, then the database management system 110 may determine that the data record from the second database table 140b matches at least one data record from the first database table 140a. Furthermore, the database management system 110 may update the first vector 270a to indicate, for example, the first data record 150a as matching a data record from the second database table 140b. As noted, the first vector 270a may be used during the performance of some JOIN operations (e.g., OUTER JOIN and/or the like) to identify, for example, data records from the second database table 140b with a matching data record in the first database table 140a. For instance, NULL values in the first vector 270a may identify data records from the first database table 140a that do not match any data records from the second database table 140b.

Figure 5:
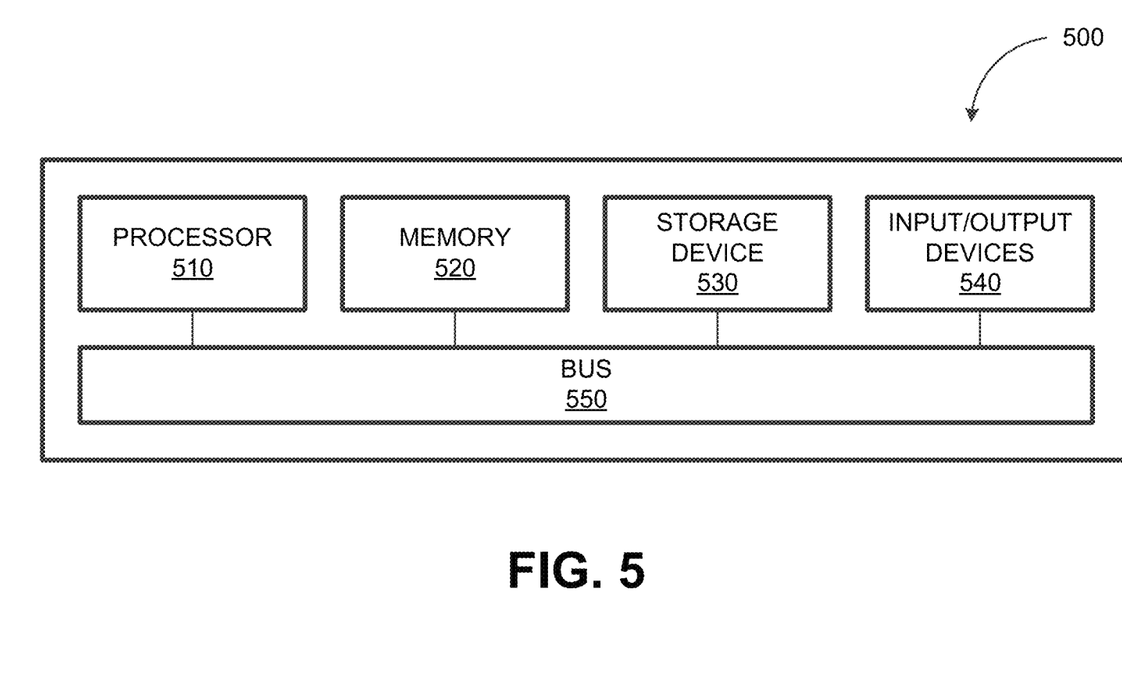
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, result in operations comprising:
    inserting, into a hash trie, a first plurality of data records from a first database table stored in a database, the inserting includes traversing the hash trie to at least identify, for a first data record from the first plurality of data records, a first node at which to insert the first data record, the hash trie being traversed based at least on a hash of a key value associated with the first data record, the first node being identified based at least on a first offset comprising a binary representation of the hash of the key value, the first offset including a first portion of a plurality of binary digits forming the binary representation, and the first data record being inserted at the first node by at least updating a data structure included at the first node; and
    executing, at the database, a database operation including a join operation between the first database table and a second database table stored at the database, the executing of the database operation including performing the join operation by at least
        traversing the hash trie filled with the first plurality of data records to identify, for a second data record of a second plurality of data records in the second database table, a second node in the hash trie occupied by a third data record of the first plurality of data records having a same key value as the second data record of the second plurality of data records,
        in response to identifying the third data record having the same key value as the second data record, updating a vector including a bit for each of the first plurality of data records, the updating of the vector includes setting a first bit in the vector corresponding to the third data record to indicate the third data record as matching the second data record, and the updating of the vector further includes bypassing a second bit in the vector corresponding to a fourth data record in the first plurality of records from the first database table that fails to match any record in the second plurality of records from the second database table, and
        determining, based at least on the vector, a result of the join operation, the result of the join operation including at least one of matching data records and non-matching data records from the first database table and the second database table, the matching data records being identified based on one or more set bits in the vector, and the non-matching data records being identified based on one or more NULL bits in the vector.

2. The system of claim 1, wherein the operations further comprise:
    identifying, based at least on a second offset comprising the binary representation of the hash of the key value, the second node in the hash trie, the second offset including a second portion of the plurality of binary digits forming the binary representation of the hash of the key value;

determining whether third data record occupying the second node is associated with a different key value than the first data record; and in response to determining that third data record is associated with the different key value, continuing the traversing of the hash trie from the second node to the first node.

3. The system of claim 1, wherein in response to determining that the first node is occupied by a fifth data record from the first plurality of data records that is associated with a same key value as the first data record, the data structure at the first node is updated by at least storing, in the data structure, the first data record.

4. The system of claim 1, further comprising:
performing a GROUP BY operation that includes grouping, based at least on a respective key value associated with each of the first plurality of data records, the first plurality of data records into one or more groups, and determining, for each of the one or more groups, a corresponding aggregate value.

5. The system of claim 1, wherein the operations further comprise:
in response to determining that the first node is occupied by a fifth data record from the first plurality of data records is associated with a same key value as the first data record, updating the data structure at the first node by at least updating an aggregate value for a group of data records that include the first data record and the fifth data record.

6. The system of claim 1, wherein the operations further comprise:
in response to determining that the first node is occupied by a fifth data record from the first plurality of data records associated with a same key value as the first data record, storing the first data record in a separate data structure and updating a vector at the first node to include a pointer to the separate data structure.

7. The system of claim 1, wherein the first database table includes a plurality of rows that each corresponds to one of the first plurality of data records, wherein the first database table further includes a plurality of columns, and wherein the key value is stored in one or more of the plurality of columns designated as a key column.

8. The system of claim 1, wherein the data structure comprises a table and/or a linked list.

9. A computer-implemented method, comprising:
inserting, into a hash trie, a first plurality of data records from a first database table stored in a database, the inserting includes traversing the hash trie to at least identify, for a first data record from the first plurality of data records, a first node at which to insert the first data record, the hash trie being traversed based at least on a hash of a key value associated with the first data record, the first node being identified based at least on a first offset comprising a binary representation of the hash of the key value, the first offset including a first portion of a plurality of binary digits forming the binary representation, and the first data record being inserted at the first node by at least updating a data structure included at the first node; and executing, at the database, a database operation including a join operation between the first database table and a second database table stored at the database, the executing of the database operation including performing the join operation by at least
traversing the hash trie filled with the first plurality of data records to identify, for a second data record of a second plurality of data records in the second database table, a second node in the hash trie occupied by a third data record of the first plurality of data records having a same key value as the second data record of the second plurality of data records, in response to identifying third data record having the same key value as the second data record, updating a vector including a bit for each of the first plurality of data records, the updating of the vector includes setting a first bit in the vector corresponding to the third data record to indicate the third data record as matching the second data record, and the updating of the vector further includes bypassing a second bit in the vector corresponding to a fourth data record in the first plurality of records from the first database table that fails to match any record in the second plurality of records from the second database table, and determining, based at least on the vector, a result of the join operation, the result of the join operation including at least one of matching data records and non-matching data records from the first database table and the second database table, the matching data records being identified based on one or more set bits in the vector, and the non-matching data records being identified based on one or more NULL bits in the vector.

10. The method of claim 9, further comprising:
identifying, based at least on a second offset comprising the binary representation of the hash of the key value, the second node in the hash trie, the second offset including a second portion of the plurality of binary digits forming the binary representation of the hash of the key value;

determining whether third data record occupying the second node is associated with a different key value than the first data record; and in response to determining that third data record is associated with the different key value, continuing the traversing of the hash trie from the second node to the first node.

11. The method of claim 9, wherein in response to determining that the first node is occupied by a fifth data record from the first plurality of data records that is associated with a same key value as the first data record, the data structure at the first node is updated by at least storing, in the data structure, the first data record.

12. The method of claim 9, further comprising:
performing a GROUP BY operation that includes grouping, based at least on a respective key value associated with each of the first plurality of data records, the first plurality of data records into one or more groups, and determining, for each of the one or more groups, a corresponding aggregate value.

13. The method of claim 9, further comprising:
in response to determining that the first node is occupied by a fifth data record from the first plurality of data records is associated with a same key value as the first data record, updating the data structure at the first node by at least updating an aggregate value for a group of data records that include the first data record and the fifth data record.

14. The method of claim 9, further comprising:
in response to determining that the first node is occupied by a fifth data record from the first plurality of data records associated with a same key value as the first data record, storing the first data record in a separate data structure and updating a vector at the first node to include a pointer to the separate data structure.

15. The method of claim 9, wherein first database table includes a plurality of rows that each corresponds to one of the first plurality of data records, wherein the first database table further includes a plurality of columns, and wherein the key value is stored in one or more of the plurality of columns designated as a key column.

16. A non-transitory computer readable medium storing instructions, which when executed by at least one data processor, result in operations comprising:

inserting, into a hash trie, a first plurality of data records from a first database table stored in a database, the inserting includes traversing the hash trie to at least identify, for a first data record from the first plurality of data records, a first node at which to insert the first data record, the hash trie being traversed based at least on a hash of a key value associated with the first data record, the first node being identified based at least on a first offset comprising a binary representation of the hash of the key value, the first offset including a first portion of a plurality of binary digits forming the binary representation, and the first data record being inserted at the first node by at least updating a data structure included at the first node; and executing, at the database, a database operation including a join operation between the first database table and a second database table stored at the database, the executing of the database operation including performing the join operation by at least traversing the hash trie filled with the first plurality of data records to identify, for a second data record of a second plurality of data records in the second database table, a second node in the hash trie occupied by a third data record of the first plurality of data records having a same key value as the second data record of the second plurality of data records, in response to identifying the third data record having the same key value as the second data record, updating a vector including a bit for each of the first plurality of data records, the updating of the vector includes setting a first bit in the vector corresponding to the third data record to indicate the third data record as matching the second data record, and the updating of the vector further includes bypassing a second bit in the vector corresponding to a fourth data record in the first plurality of records from the first database table that fails to match any record in the second plurality of records from the second database table, and determining, based at least on the vector, a result of the join operation, the resulting of the join operation including at least one of matching data records and non-matching data records from the first database table and the second database table, the matching data records being identified based on one or more set bits in the vector, and the non-matching data records being identified based on one or more NULL bits in the vector.

* * * * *